(12) United States Patent
Miyamori et al.

(10) Patent No.: US 6,416,840 B1
(45) Date of Patent: *Jul. 9, 2002

(54) FLUORINE-CONTAINING MELTABLE RESIN COMPOSITION

(75) Inventors: Tsuyoshi Miyamori; Masaji Komori; Masami Katoh; Tetsuo Shimizu, all of Settsu (JP)

(73) Assignee: Daikin Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/836,408

(22) PCT Filed: Oct. 27, 1995

(86) PCT No.: PCT/JP95/02212

§ 371 (c)(1),
(2), (4) Date: May 2, 1997

(87) PCT Pub. No.: WO96/14359

PCT Pub. Date: May 17, 1996

(30) Foreign Application Priority Data

Nov. 4, 1994 (JP) .............................................. 6-271458

(51) Int. Cl.$^7$ .............................. B32B 3/02; C08K 3/38
(52) U.S. Cl. ....................... 428/66.4; 524/405; 524/544; 524/545; 524/546
(58) Field of Search ................................. 524/405, 544, 524/545, 546; 428/66.4

(56) References Cited

U.S. PATENT DOCUMENTS

| | | | | |
|---|---|---|---|---|
| 5,240,753 A | * | 8/1993 | Tabuchi et al. | 428/36.4 |
| 5,433,870 A | | 7/1995 | Nakamaru et al. | 252/12.4 |
| 6,225,399 B1 | * | 5/2001 | Araki et al. | 524/544 |
| 6,255,380 B1 | * | 7/2001 | Oki et al. | 524/520 |

FOREIGN PATENT DOCUMENTS

| | | |
|---|---|---|
| JP | 6200280 A | 7/1994 |
| JP | 60120798 A | 6/1995 |

* cited by examiner

Primary Examiner—Peter D. Mulcahy
(74) Attorney, Agent, or Firm—Birch, Stewart, Kolasch & Birch, LLP

(57) ABSTRACT

An injection moldable fluorine-containing meltable resin composition comprising 70 to 98 wt. % of a fluorine-containing meltable resin, and 2 to 30 wt. % of a needle-shape material having an average diameter of 3 μm or less, an average aspect ratio of between 10 and 100, and Mohs hardness of between 5 and 8, which composition has good sliding and sealing properties and excellent moldability, in particular, moldability of thin wall articles.

16 Claims, 1 Drawing Sheet

Figure 1:
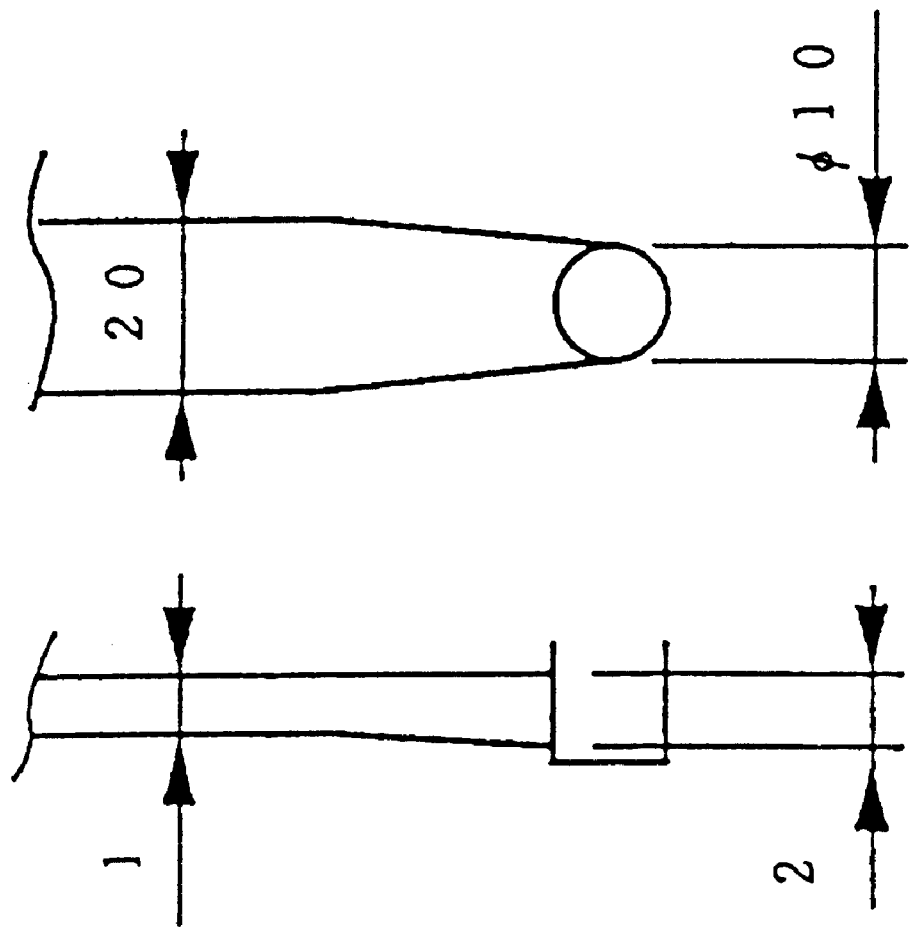

Cavity sizes: Thickness: 1 mm
Width:     20 mm
Gate:    Film gate

Cavity sizes: Thickness: 1 mm
Width: 20 mm
Gate: Film gate

FLUORINE-CONTAINING MELTABLE RESIN COMPOSITION

FIELD OF THE INVENTION

The present invention relates to a novel fluorine-containing meltable resin composition. In particular, the present invention relates to a fluorine-containing meltable resin composition comprising a fluorine-containing resin to which a specific needle-shape material is compounded, having good sliding and sealing properties and being able to be injection molded, which composition is suitable for dynamic sealing materials such as seal rings for automatic transmissions of automobiles, seal rings for hydraulic devices for braking, seals for power steerings, seal rings for CVTs, piston rings for shock absorbers, chip seals for compressors of air conditioners, valve seals, tubes for push-pull cables, gaskets, and bearings.

PRIOR ART

Hitherto, tetrafluoroethylene polymer compositions containing inorganic or organic fillers for improving dimensional stability, creep resistance, wear resistance and the like are known as materials used for producing sliding parts for automobiles or industrial equipments. However, the dimensional stability and creep resistance are not satisfactorily improved by the fillers. Furthermore, these compositions have a drawback that they cannot be injection molded, and therefore, they have low productivity and are not preferable in view of production costs.

For example, in the processing of pistons for shock absorbers, a peripheral surface is shaped in a special form, and a layer of polytetrafluoroethylene (PTFE) is wrapped around the peripheral surface by press molding and then fusion bonded to prevent the deterioration of durability due to twisting of the PTFE resin layer which is caused by repeated reciprocal movement because of low adhesion between PTFE and the piston.

Some compositions have been proposed, which comprise injection moldable heat resistant resins and various solid lubricants or for reinforcing materials for imparting sliding properties to such the resins or reinforcing them. However, such the compositions have inferior sliding properties to the tetrafluoroethylene polymer compositions, and furthermore, they are too stiff to achieve sufficient sealing properties in applications where the sealing properties are also required.

With the decrease of weights of various equipments in these years, soft materials such as aluminum are increasingly used. When such the soft materials are used as opposite substrates, the above conventional resin materials damage the substrates during sliding movement. Furthermore, no compositions satisfy the sliding properties and other properties when they are used in applications which require the high sliding properties, for example, the use at high speed under high load.

JP-A-6-200280 discloses a multilayer sliding part comprising a part substrate and a lubricating composition which comprises a fluororesin and zinc oxide whiskers and is impregnated in and coated on the substrate. However, this composition uses PTFE having no flowability as a matrix, and cannot be injection molded. In addition, the advantages of fillers having tetrapod-form three dimensional shapes represented by the zinc oxide whiskers cannot be attained when they are added to a material which is expected to be used for melt molding.

JP-A-60-120798 discloses a sliding member comprising a fluororesin and silicon carbide whiskers. The addition of filler having high hardness such as the silicon carbide whiskers can improve the wear resistance of the resin composition, but may cause a problem that the composition wears the substrate over which the sliding member is slid, due to the excessively increased attacking properties of the composition.

JP-A-5-117475 discloses a resin composition comprising a fluorine-containing meltable resin and carbon whiskers (carbon fibers). This composition has several excellent properties and also good sliding properties because of the inherent sliding properties of the carbon whiskers having low hardness. However, the sliding properties may be still insufficient for the applications requiring high sliding properties such as the use at high speed under high load.

In general, the fluorine-containing meltable resins are said to have lower flowability and less injection moldability than other thermoplastic resins. Meltable resin compositions comprising the fluorine-containing meltable resin and common fillers tend to form blisters or flow marks on the surface when molded articles have a thin wall, that is, they have low moldability of thin-wall articles.

SUMMARY OF THE INVENTION

The present invention intends to solve the drawbacks of the conventional fluororesin compositions, in particular, the fluorine-containing meltable resin compositions and provide a fluorine-containing meltable resin composition which is preferable as a material for sliding parts for automatic transmissions of automobiles, sliding parts for pistons of shock absorbers, and various types of seals.

According to the first aspect, the present invention provides an injection moldable fluorine-containing meltable resin composition comprising 70 to 98 wt. % of a fluorine-containing meltable resin, and 2 to 30 wt. % of a needle-shape material having an average diameter of 3 $\mu$m or less, an average aspect ratio of between 10 and 100, and Mohs hardness of between 5 and 8.

According to the second aspect, the present invention provide a dynamic sealing material such as a sealing ring for automatic transmissions of automobiles, consisting of a molded article of the fluorine-containing meltable resin composition according to the present invention, or a shock absorber comprising a piston and a piston ring which is placed around the peripheral surface of the piston wherein the piston ring consists of a molded article of the fluorine-containing meltable resin composition according to the present invention.

According to the third aspect, the present invention provide a method for producing the above dynamic sealing material.

BRIEF DESCRIPTION OF THE INVENTION

FIG. 1 a schematic view of the gate of a bar flow mold used in Examples.

DETAILED DESCRIPTION OF THE INVENTION

The injection moldable fluorine-containing meltable resin which is contained in the resin composition of the present invention is well known, and its kind is not limit. Preferred examples of the fluorine-containing meltable resin are tetrafluoroethylene-fluoroalkyl vinyl ether copolymers (hereinafter referred to as "PFA"), tetrafluoroethylene-hexafluoropropylene copolymers (hereinafter referred to as "FEP"), tetrafluoroethylene-ethylene copolymers (hereinafter referred to as "ETFE"), polyvinylidene fluoride, polychlorotrifluoroethylene, ethylene-chlorotrifluoroethylene copolymers, and the like. Among them, PFA, FEP and ETFE are more preferable in view of the heat resistance, sliding properties, moldability, and the like. In particular, PFA is preferable. The molecular weight of the fluorine-containing meltable resin is preferably in the range between 50,000 and 5,000,000.

PFA is a copolymer of tetrafluoroethylene and at least one fluoroalkyl vinyl ether of the formula: $CF_2=CF-O-Rf$ wherein Rf is a fluoroalkyl group having 1 to 10 carbon atoms. Perfluoro(alkyl vinyl ether) is preferable as the fluoroalkyl vinyl ether. Preferably, PFA comprises 99 to 92 wt. % of tetrafluoroethylene and 1 to 8 wt. % of the fluoroalkyl vinyl ether.

FEP preferably comprises 99 to 80 wt. % of tetrafluoroethylene and 1 to 20 wt. % of hexafluoropropylene.

ETFE preferably comprises 90 to 74 wt. % of tetrafluoroethylene and 10 to 26 wt. % of ethylene.

The fluorine-containing meltable resins may comprise other monomer insofar as the inherent properties of the resin are not impaired. Examples of the other monomers are tetrafluoroethylene (except in the case of PFA, FEP and ETFE), hexafluoropropylene (except in the case of FEP), perfluoroalkyl vinyl ethers (except in the case of PFA), perfluoroalkylethylene having 1 to 10 carbon atoms in the alkyl group, perfluoroalkyl aryl ethers having 1 to 10 carbon atoms in the alkyl group, and compounds of the formula:

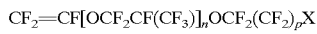

$$CF_2=CF[OCF_2CF(CF_3)]_nOCF_2(CF_2)_pX$$

wherein X is a halogen atom, n is a number of 0 to 5 and p is a number of 0 to 2. The amount of the other monomer is 50 wt. % or less, preferably between 0.01 and 45 wt. % based on the weight of the polymer.

The needle-shape material used in the resin composition of the present invention has an average diameter of 3 μm or less, an aspect ratio of between 10 and 100 and a Mohs hardness of between 5 and 8. The material having a Mohs hardness of between 6 and 8 is preferable for effectively achieving the effects of the present invention. For example, borate whiskers such as aluminum borate whiskers and magnesium borate whiskers are used as the needle-shape materials.

When the average diameter of the needle-shape material exceeds 3 μm, it is difficult to mold the composition while maintaining the good moldability (moldability of thin-wall articles).

When the aspect ratio is less than 10, the wear resistance is insufficient, while when the aspect ratio exceeds 100, the anisotropy may appear during molding of thin-wall articles.

When the Mohs hardness exceeds 8, the soft metals may be flawed. When the Mohs hardness is less than 5, the composition may have insufficient strength under the high load condition under which the composition is lubricated with oils, although the composition can be used in the absence of a lubricant.

In general, the amounts of the fluorine-containing meltable resin and needle-shape material are between 70 and 98 wt. % and between 2 and 30 wt. %, respectively.

When the amount of the needle-shape material is less than 2 wt. %, the improvement of the strength, heat resistance, dimensional stability and sliding properties are hardly expected. When this amount exceeds 30 wt. %, the moldability of the composition deteriorates, and the molded articles having the above properties may not be produced in good conditions.

The resin composition of the present invention may contain at least one additive selected from other inorganic or organic fillers and conventionally used additives in such amounts that the effects of the present invention are not impaired. The amount of these additives is between 2 and 15 wt. % based on the weight of whole composition.

Examples of the inorganic fillers are as follows:

metals such as stainless steel, iron, nickel, lead, copper, gold, silver, aluminum, molybdenum, rare earth metal, cobalt, boron fibers, etc.;

carbonaceous materials such as carbon black, graphite, carbon fibers, activated carbon, carbon, graphite hollow particles, cokes, etc.;

oxides such as silica, alumina, titanium oxide, iron oxide, zinc oxide, magnesium oxide, tin oxide, antimony oxide, etc.;

hydroxides such as aluminum hydroxide, magnesium hydroxide, etc.;

carbonates such as calcium carbonate, magnesium carbonate, zinc carbonate, etc.;

sulfates such as calcium sulfate, barium sulfate, magnesium sulfate, MOS (fibrous basic magnesium sulfate), etc.;

silicates such as glass, hollow glass particles, glass fibers, talc, mica, kaolin, calcium silicate, wollastonite, xonotlite, PMF (a slug-form fiber. a mixture of calcium aluminosilicate and magnesium oxide), etc.;

titanates such as potassium titanate, barium titanate, etc.;

nitrides such as aluminum nitride, silicon nitride, etc.;

carbides such as silicon carbides, titanium carbides, etc.;

sulfides such as molybdenum disulfide, molybdenum trisulfide, tungsten disulfide, zinc sulfide, cadmium sulfide, etc.;

phosphates such as calcium phosphate, iron phosphate, etc.;

ferrites such as barium ferrite, calcium ferrite, strontium ferrite, etc.;

The shapes of these inorganic fillers are not limited, and fibrous, needle-shape, powder, granular and beads-shape ones can be used.

The addition of glass or carbon fibers is preferable since the coefficient of thermal expansion of the composition can be decreased.

The organic fillers are organic materials except fluorine-containing polymers, which are highly heat resistance, are not decomposed or molten at temperature at which the resin composition of the present invention is prepared or at which the composition is processed to produce the molded articles, and can impart mechanical properties, wear resistance or other functions to the molded articles.

Preferably, the organic fillers are organic materials having a melting point of 400° C. or higher, or a decomposition temperature of 400° C. or higher when they are non-meltable. Specific examples of the organic fillers are organic fibers such as aramid fibers, polyarylate fibers, phenol resin fibers, etc., and thermosetting resins such as polyimide, phenol resins, condensed polynucleic aromatic (COPNA) resins, etc.

In addition to the above organic fillers, elastomers and so-called engineering plastics such as polyketones, polyethersulfone, polyphenylenesulfide, liquid crystal polymers, etc. may be exemplified.

The organic fillers may be used independently or in admixture of two or more of them.

The flowability of the composition can be improved by the addition of the liquid crystal polymers.

The amount of these additive resins is between 2 and 10 wt. % based on the weight of the whole composition.

The above fillers, in particular, the inorganic fillers may be surface treated with the following compounds:

aminosilane coupling agents such as γ-aminopropyltriethoxysilane $(H_2N(CH_2)_3Si(OC_2H_5)_3)$, m- or p-aminophenyl-triethoxysilane $(H_2N—C_6H_4—Si(OC_2H_5)_3)$, γ-ureidopropyltriethoxy-silane $(H_2NCONH(CH_2)_3Si(OC_2H_5)_3)$, N-(β-aminoethyl)-γ-aminopropyl-trimethoxysilane $(H_2N(CH_2)_2NH(CH_2)_3Si(OCH_3)_3)$, N-(β-aminoethyl)-γ-aminopropylmethyldimethoxysilane $(H_2N(CH_2)_2NH(CH_2)_3SiCH_3-(OCH_3)_2)$, etc.; and organic silane compounds such as phenyltrimethoxysilane, phenyltriethoxysilane, p-chlorophenyltrimethoxy-silane, p-bromomethylphenyltrimethoxysilane, diphenyldimethoxy-silane, diphenyldiethoxysilane, diphenylsilanediol, etc.

In some cases, metal soaps such as zinc stearate or other lubricants may be added to the resin composition to increase the flowability, mold-releasing properties, etc. for facilitating molding. The kinds of these lubricants are not limited.

The resin composition of the present invention may be prepared by any conventional mixing process. For example, the components are mixed with a mixing apparatus such as a twin-cylinder mixer, tumbling mixer, Henschel mixer, and the like, and further mixed and pelletized with a melt kneading apparatus such as a twin-screw extruder.

It is also preferable to prepare a premix of the needle-shape material and fluorine-containing meltable resin and then mix the premix and other components by the above mixing methods.

The obtained pellets can be molded by any conventional molding method for thermoplastic resins such as injection molding, compression molding, extrusion molding, and the like to form articles having a desired shape such as plates, films, and the like. The injection molding is preferable for producing sliding parts at good productivity.

The resin composition of the present invention has good moldability, for example, moldability of thin wall articles in the insert injection molding in which a metal part which constitutes a core is beforehand placed in a mold and then the fluorine-containing meltable resin composition is injected in the mold, because of the good flowability of the resin composition, and thin-wall sliding parts can be obtained.

EXAMPLES

The present invention will be explained by Examples and Comparative Examples, which do not limit the scope of the present invention.

Resin compositions prepared in Examples and Comparative Examples were evaluated by the following test methods:

Raw materials listed in each of Examples and Comparative Examples were melt kneaded with a twin-screw extruder (LABOPLATOMILL manufactured by TOYO SEIKI Co., Ltd.) at a temperature of between 300 and 370° C., and a resin composition for injection molding was obtained. Then, the resin composition was supplied into an injection molding equipment (SG 50 MIV manufactured by SUMITOMO HEAVY INDUSTRIES, LTD.) and subjected to a flowability test using a mold for bar flow molding, and at the same time, a test piece for a friction and wear test was molded at a cylinder temperature of between 330 and 400° C. and a mold temperature of 200° C.

1. Flowability test

Flowability and appearance were evaluated by injection molding the resin composition using a mold for bar flow molding.

The shape of the mold gate for bar flow molding is shown in FIG. 1.

Bar flow test conditions:

Cylinder temperature: 320–400° C.

Nozzle temperature: 400° C.

Mold temperature: 200° C.

Injection pressure: 800 kg/cm$^2$

Screw rotation rate: 150 rpm

Injection rate: 2, 5, 8 or 12 mm/min.

2. Friction and wear test

Sliding properties were evaluated using a thrust-type friction and wear tester (manufactured by ORIENTEC).

Test conditions for Table 2

Substrate: carburized steel (S45C)

Load: 8 kgf/cm$^2$

Rate: 0.5 m/sec.

Time: 24 hours

Measured items

Friction coefficient

Specific worn amount (unit: cm·s/MPa·m·h)

Test conditions for Table 3

Substrate: carburized steel (S45C)

Load: 4 kgf/cm2

Rate: 0.5 m/sec.

Time: 24 hours

Measured items

Friction coefficient

Specific worn amount (unit: mm$^3$/(km·kgf))

Example 1

92 wt. % NEOFLON PFA AP-201 (manufactured by DAIKIN INDUSTRIES, Ltd.)

8 wt. % Aluminum borate whisker ("ALBOREX" (trade name) manufactured by SHIKOKU CHEMICAL INDUSTRIES, Ltd. average diameter: 1 μm, aspect ratio: 30, Mohs hardness: 7)

Example 2

95 wt. % NEOFLON PFA AP-201 (manufactured by DAIKIN INDUSTRIES, Ltd.)

5 wt. % Aluminum borate whisker ("ALBOREX" (trade name) manufactured by SHIKOKU CHEMICAL INDUSTRIES, Ltd. average diameter: 1 μm, aspect ratio: 30, Mohs hardness: 7)

Example 3

70 wt. % NEOFLON PFA AP-201 (manufactured by DAIKIN INDUSTRIES, Ltd.)

30 wt. % Aluminum borate whisker ("ALBOREX" (trade name) manufactured by SHIKOKU CHEMICAL INDUSTRIES, Ltd. average diameter: 1 μm, aspect ratio: 30, Mohs hardness: 7)

Example 4

92 wt. % NEOFLON PFA AP-201 (manufactured by DAIKIN INDUSTRIES, Ltd.)

8 wt. % Aluminum borate whisker ("ALBOREX" (trade name) manufactured by SHIKOKU CHEMICAL INDUSTRIES, Ltd. average diameter: 1.5 μm, aspect ratio: 20, Mohs hardness: 7)

Example 5

92 wt. % NEOFLON PFA AP-201 (manufactured by DAIKIN INDUSTRIES, Ltd.)

8 wt. % Magnesium borate whisker (average diameter: 0.5–1 μm, average length: 10–40 μm, Mohs hardness: 7)

Comparative Example 1

92 wt. % NEOFLON PFA AP-201 (manufactured by DAIKIN INDUSTRIES, Ltd.)

8 wt. % Potassium titanate whisker ("TAIBLEX" (trade name) manufactured by KAWATETSU MINING, Ltd. average diameter: <1 μm, average length: 20 μm, Mohs hardness: 4)

Comparative Example 2

95 wt. % NEOFLON PFA AP-201 (manufactured by DAIKIN INDUSTRIES, Ltd.)

1 0 5 wt. % PAN carbon fiber ("TORAYCA" (trade name) manufactured by TORAY. average diameter: 7 μm, aspect ratio: 10)

Comparative Example 3

95 wt. % NEOFLON PFA AP-201 (manufactured by DAIKIN INDUSTRIES, Ltd.)

5 wt. % Pitch carbon fiber ("KURECA" (trade name) manufactured by KUREHA CHEMICAL INDUSTRIES, Ltd. average diameter: 14.5 μm, aspect ratio: 20)

Comparative Example 4

92 wt. % NEOFLON PFA AP-201 (manufactured by DAIKIN INDUSTRIES, Ltd.)

8 wt. % Aluminum borate ("ALBORITE" (trade name) manufactured by SHIKOKU CHEMICAL CORPORATION, Ltd. average particle size: 3 μm, Mohs hardness: 7)

Comparative Example 5

92 wt. % NEOFLON PFA AP-201 (manufactured by DAIKIN INDUSTRIES, Ltd.)

8 wt. % Magnesium borate (average particle size: 3 μm, Mohs hardness: 7)

Comparative Example 6

91 wt. % NEOFLON PFA AP-201 (manufactured by DAIKIN INDUSTRIES, Ltd.)

9 wt. % Silicon carbide whisker ("TOKA WHISKER" (trade name) manufactured by TOKAI CARBON Co., Ltd. average diameter: 0.3–0.6 μm, average length: 5–15 μm, Mohs hardness: 9)

Comparative Example 7

85 wt. % NEOFLON PFA AP-201 (manufactured by DAIKIN INDUSTRIES, Ltd.)

15 wt. % Zinc oxide whisker ("PANATETRA" (trade name) manufactured by MATSUSHITA AMTEC. average diameter: 0.2–3.0 μm, average length: 2–50 μm, Mohs hardness: 4)

Comparative Example 8

92 wt. % NEOFLON PFA AP-201 (manufactured by DAIKIN INDUSTRIES, Ltd.)

8 wt. % Calcium carbonate whisker ("WHISCAL" (trade name) manufactured by SHIKOKU CHEMICAL CORPORATION, Ltd. average diameter: 0.5–1.0 μm, average length 20–30 μm, Mohs hardness: 3.5–4)

The results of the flowability test and friction and wear test are shown in Tables 1, 2 and 3, respectively.

TABLE 1

| | Injection rate (mm/sec.) | Bar flow length (mm) | Surface conditions |
|---|---|---|---|
| Ex. 1 | 2 | 31 | |
| | 5 | 103 | Good surface |
| | 8 | 120 | Vertical wrinkles |
| | 12 | 127 | Surface roughness |
| Comp. Ex. 1 | 2 | 30 | Flow marks, warped |
| | 5 | 105 | Flow marks, bubbles |
| | 8 | 117 | Flow marks, bubbles, skin layer |
| | 12 | 123 | Surface roughness, hairiness, bubbles |
| Comp. Ex. 3 | 2 | 30 | Tip end disordered |
| | 5 | 115 | Flow marks, bubbles, silver streaks |
| | 8 | 133 | Flow marks, silver streaks, a few bubbles |
| | 12 | 138 | Flow marks, silver streaks, a few bubbles, vertical wrinkles |

TABLE 2

| | Friction coefficient | Wear Rate (cm · s/MPa · m · h) |
|---|---|---|
| Example 1 | 0.17–0.23 | $8.3 \times 10^{-6}$ |
| Comp. Ex. 2 | 0.17–0.23 | $2.1 \times 10^{-4}$ |

TABLE 3

| | Friction coefficient | Specific Wear rate | Note |
|---|---|---|---|
| Ex. 1 | 0.20–0.24 | $4.9 \times 10^{-2}$ | |
| Ex. 2 | 0.19–0.24 | $6.7 \times 10^{-2}$ | |
| Ex. 3 | 0.15–0.19 | $3.8 \times 10^{-2}$ | |
| Ex. 4 | 0.26–0.30 | $2.9 \times 10^{-2}$ | |
| Ex. 5 | 0.24–0.28 | $4.2 \times 10^{-2}$ | |
| C. Ex. 1 | 0.26–0.34 | $4.9 \times 10^{-2}$ | Large fluctuation of friction coefficient |
| C. Ex. 4 | 0.26–0.36 | $8.1 \times 10^{-2}$ | Large fluctuation of friction coefficient |
| C. Ex. 5 | 0.43–0.51 | $6.5 \times 10^{-2}$ | Large fluctuation of friction coefficient |
| C. Ex. 6 | 0.20–0.22 | $9.5 \times 10^{-2}$ | Against Worn |
| C. Ex. 7 | Melting wearing | Melting wearing | |
| C. Ex. 8 | Melting wearing | Melting wearing | Bubbled during molding |

From the results in Table 1, it is understood that the composition of Comparative Example 1 or the compositions containing the carbon fiber having the large average diameter and the like had inferior moldability of thin wall articles.

From the results of Table 2, it is understood that the sliding properties of the carbon fiber which is conventionally used for imparting sliding properties has the inferior sliding properties to the specific needle-shape materials used according to the present invention.

From the results of Table 3, it is understood that, although the components were used at the same volume ratios in Examples 1, 4 and 5 and Comparative Examples 1 and 4–8, the composition of Comparative Example 1 suffered from the large fluctuation of friction coefficient and the compositions of Comparative Examples 4 and 5 had low wear resistance and suffered from large fluctuation of friction coefficient because the fillers were granular. Furthermore, the composition of Comparative Example 6 flawed the substrate and therefore its own specific wear rate increased. The compositions of Comparative Examples 7 and 8 suffered from abrupt wearing and were melting worn.

Effects of the Invention

The present invention provides a fluorine-containing meltable resin composition which has the good sliding and sealing properties required for the sliding parts used in the automobile and industrial equipment fields, in particular, the sliding and sealing properties at high speed under high load, and also excellent moldability, in particular, moldability of thin wall articles.

What is claimed is:

1. An article of manufacture, comprising:
    a sliding part; and
    a sealing ring placed around a peripheral surface of said sliding part, said sealing ring being made of a fluorine-containing meltable resin composition comprising:
        70 to 98 wt. % of a fluorine-containing meltable resin, and
        2 to 30 wt. % of a needle-shape material having an average diameter of 3 $\mu$m or less, an average aspect ratio of between 10 and 100, and Mohs hardness of between 6 and 8.

2. The article of manufacture according to claim 1, wherein said needle-shape material is a borate whisker.

3. The article of manufacture according to claim 2, wherein said borate whisker is an aluminum borate whisker.

4. The article of manufacture according to claim 2, wherein said borate whisker is a magnesium borate whisker.

5. The article of manufacture according to claim 1, wherein said fluorine-containing meltable resin is a tetrafluoroethylene-fluoroalkyl vinyl ether copolymer, a tetrafluoroethylene-hexafluro-propylene copolymer of an ethylene-tetrafluoroethylene copolymer.

6. The article of manufacture according to claim 1, wherein said article of manufacture is a shock absorber.

7. The article of manufacture according to claim 1, wherein said article of manufacture is a power steering device.

8. The article of manufacture according to claim 1, wherein said article of manufacture is an automatic transmission.

9. The article of manufacture according to claim 1, wherein said article of manufacture is a constant velocity joint.

10. The article of manufacture according to claim 1, wherein said article of manufacture is a hydraulic device for braking.

11. The article of manufacture according to claim 1, wherein said article of manufacture is a compressor for air conditioners.

12. A method of making a sealing ring for an article of manufacture, comprising:
    providing a fluorine-containing meltable resin composition comprising:
        70 to 98 wt. % of a fluorine-containing meltable resin, and
        2 to 30 wt. % of a needle-shape material having an average diameter of 3 $\mu$m or less, an average aspect ratio of between 10 and 100, and Mohs hardness of between 6 and 8; and
    forming a sealing ring from said composition by injection molding of said composition in an injection molding machine.

13. The method of making a sealing ring according to claim 12, wherein said needle-shape material is a borate whisker.

14. The method of making a sealing ring according to claim 13, wherein said borate whisker is an aluminum borate whisker.

15. The method of making a sealing ring according to claim 13, wherein said borate whisker is a magnesium borate whisker.

16. The method of making a sealing ring according to claim 12, wherein said fluorine-containing meltable resin is a tetrafluoroethylene-fluoroalkyl vinyl ether copolymer, a tetrafluoroethylene-hexafluro-propylene copolymer or an ethylene-tetrafluoroethylene copolymer.

* * * * *